United States Patent [19]

Endo et al.

[11] Patent Number: 4,892,006
[45] Date of Patent: Jan. 9, 1990

[54] STEERING WHEEL RIM CORE AND ELONGATED BLANK THEREFOR

[75] Inventors: Tetsuji Endo, Fujinomiya; Kazuyoshi Nishijima, Shizuoka, both of Japan

[73] Assignee: Nihon Plast Co., Ltd., Fuji, Japan

[21] Appl. No.: 130,720

[22] Filed: Dec. 8, 1987

[30] Foreign Application Priority Data

Dec. 12, 1986 [JP] Japan .................................. 61-296127
Dec. 12, 1986 [JP] Japan .................................. 61-296128

[51] Int. Cl.⁴ .............................................. B62D 1/04
[52] U.S. Cl. .................................... 74/552; 29/159 B; 428/156
[58] Field of Search .................................. 74/552–558; 280/750, 731, 777, 778; 29/159 B; 428/156

[56] References Cited

U.S. PATENT DOCUMENTS

| | | | |
|---|---|---|---|
| 87,823 | 3/1869 | Coney | 74/552 |
| 1,591,269 | 7/1926 | Beck | 74/552 |
| 1,816,444 | 7/1931 | Smith | 74/552 X |
| 1,854,780 | 4/1932 | Bronson | 74/552 |
| 3,576,139 | 4/1971 | Conterno | 74/552 |
| 4,359,911 | 11/1982 | Eubanks et al. | 74/552 |

FOREIGN PATENT DOCUMENTS

| | | | |
|---|---|---|---|
| 0050309 | 4/1982 | European Pat. Off. | 74/552 |
| 2919284 | 11/1980 | Fed. Rep. of Germany | 74/552 |
| 658988 | 6/1929 | France | 74/552 |
| 0040928 | 4/1978 | Japan | 74/552 |
| 56-57171 | 5/1981 | Japan | 74/552 |
| 0113770 | 6/1985 | Japan | 74/552 |
| 60-104368 | 7/1985 | Japan | 74/552 |
| 0174361 | 9/1985 | Japan | 74/552 |
| 1398685 | 6/1975 | United Kingdom | 74/552 |
| 2058694 | 4/1981 | United Kingdom | 74/552 |

*Primary Examiner*—Vinh T. Luong
*Attorney, Agent, or Firm*—Armstrong, Nikaido, Marmelstein, Kubovcik & Murray

[57] ABSTRACT

An annular rim core of a steering wheel is made from an elongated blank which has, as viewed in cross-section taken in a plane perpendicular to the longitudinal axis thereof, a pair of opposite sides, a first recess formed in one of the sides and sized to fittingly receive a first type of spoke core, and a second recess formed in either one of a bottom of the first recess and the other side and sized to fittingly receive a second type of spoke core. The annular rim core is formed by bending the elongated blank into a circular shape such that the one or the other side of the blank is directed radially inwardly of the circle.

3 Claims, 5 Drawing Sheets

STEERING WHEEL RIM CORE AND ELONGATED BLANK THEREFOR

BACKGROUND OF THE INVENTION

The present invention relates generally to a steering wheel having an annular rim and at least one spoke through which the rim is connected to a central hub. More particularly, the present invention is concerned with an elongated blank for a core of a steering wheel rim, having recess or recesses, as viewed in section, which are sized to fit to end portions of spoke cores of different sizes. The invention is also concerned with a core of a steering wheel rim produced from such a blank.

Hitherto, various types of steering wheel core structure have been proposed. For instance, Japanese Utility Model Laid-Open Publication No. 104368/1985 discloses a steering wheel core structure composed of a hollow rim core having a groove formed in an outer surface thereof and web-like spoke cores having outer ends fitting in the groove and connected to the rim core.

This steering wheel core structure provides an appreciably high level of connection between the rim core and the web-like spoke cores. Unfortunately, however, this type of rim core cannot be combined with different types of spoke cores having different thicknesses. Namely, when web-type spoke cores of different thicknesses or rod-type spoke cores are to be used, it has been necessary to prepare a different rim core having a groove which is sized to receive the outer ends of a spoke core of a different type. In addition, when a rod-type spoke core is used, the rim core is required to have a groove of a width which is large enough to receive the ends of such a spoke core, with the result that the diameter of the section of the rim core is increased.

Another type of steering wheel core structure is proposed in Japanese Utility Model Laid-Open Publication No. 57171/1981. In this structure, spoke cores are connected to a rim core by means of brackets or pipe members so as to assure a high strength of connection between the spoke cores and the rim core. This type of core structure, however, necessitates an increased number of parts to be employed due to the use of the brackets or pipe members, so that the cost of the steering wheel is raised undesirably.

Thus, the first-mentioned known steering wheel core structure employing a rim core with a groove sized to fit to the end portions of spoke cores suffers from a disadvantage that the production cost of steering wheels is raised because it is necessary to prepare rim cores having different groove sizes. The second-mentioned known steering wheel core structure which employs brakets or pipe members also encounters a problem that the production cost is raised due to the use of a number of parts.

SUMMARY OF THE INVENTION

Accordingly, an object of the present invention is to provide an elongated blank of steering wheel rim cores which can be used with spoke cores of different shapes and thicknesses and, therefore, contribute to reduction in the production cost of steering wheels, while attaining sufficiently high level of mechanical connection between the rim core and spoke cores.

Another object of the present invention is to provide a steering wheel rim core produced form such a blank.

The elongated blank for an annular rim core of a steering wheel according to one aspect of the invention has, as viewed in a cross-section taken in a plane perpendicular to the axis of the blank, a pair of opposite sides, a first recess formed in one of the sides and sized to fittingly receive a first type of spoke core having a first thickness, and a second recess formed in one of a bottom of the first recess and the other side of the blank and sized to receive a second type of spoke core having a second thickness different from the first thickness. The blank is adapted to be bent into a circular shape so as to form the annular rim core such that one of the sides of the blank is directed radially inwardly of the annular rim core.

The annular rim core for a steering wheel according to another aspect of the invention has, as viewed in a plane containing the axis of the annular rim core, a first recess formed in the radially inner side of the annular rim core and sized to fittingly receive a first type of spoke core having a first thickness and a second recess formed in one of a bottom of the first recess and the radially outer side of the annular rim core.

The steering wheel rim core formed from the elongated blank in accordance with the present invention can be used with various types of spoke cores having different shapes and thicknesses, e.g., web-type spoke cores having different thicknesses and rod-type spoke cores having different diameters. The fact that a single design of the steering wheel rim core can be combined with a variety of types of spoke cores greatly reduces the production cost of steering wheels advantageously.

Furthermore, the steering wheel rim core formed from the elongated blank of the invention exhibits a high rigidity of the rim core as well as a high strength of connection between the rim core and the spoke cores due to the provision of the first and second recesses.

These and other objects, features and advantages of the present invention will become more apparent from the following description with reference to the accompanying drawings.

DESCRIPTION OF THE PREFERRED EMBODIMENTS

Figure 1:
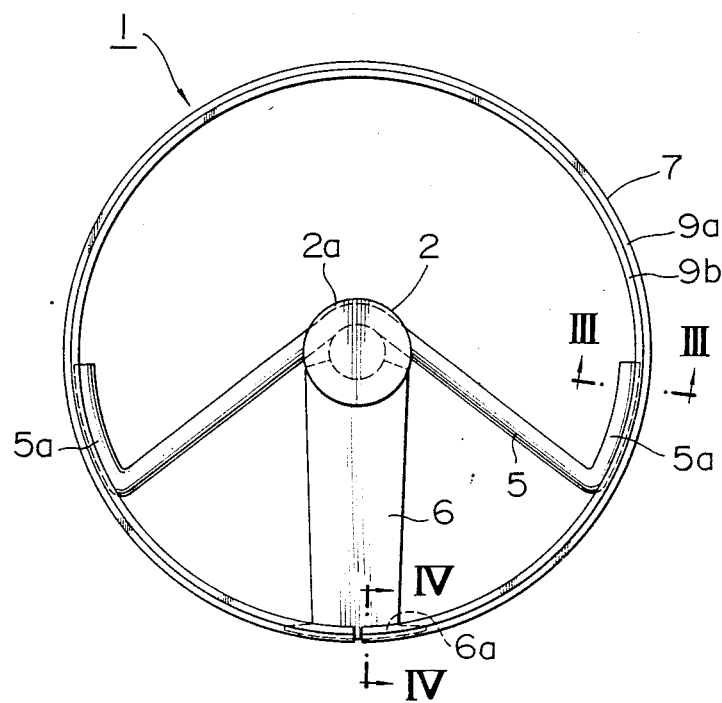
FIG. 1 is a plan view of a steering wheel core assembly including an embodiment of a rim core embodying the present invention.
Figure 2:
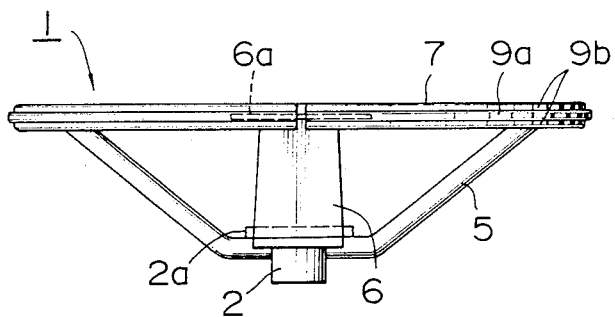
FIG. 2 is a side elevational view of the steering wheel core assembly shown in FIG. 1.

Referring first to FIGS. 1 and 2, a steering wheel core assembly generally denoted by 1 has an annular rim core 7, a rod-type spoke core 5 having two spoke portions, and a web-type spoke core 6. The rim core 7 is connected to a central hub 2 of the steering wheel 1 through the spoke cores 5 and 6. More specifically, the rod-type spoke core 5 is secured at its substantially mid portion to the lower side of a flange 2a of the hub 2 by, for example, resistance welding, while both end portions 5a of the rod-type spoke core 5 are bent in conformity with the curvature of the rim core 7 and are secured to the rim core 7 in a manner which will be explained later. The web-type spoke core 6 has a radially inner end portion which is secured to the lower side of the flange 2a of the hub 2 by, for example, resistance welding, while a radially outer end portion 6a of the web-type spoke core 6 is enlarged or extended in the circumferential direction of the rim core 7 with the same curvature as the rim core 7 so as to be fixed to the rim core 7.

Figure 3:
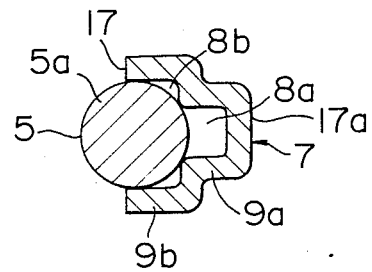
FIG. 3 is a sectional view taken along the line III—III in FIG. 1.
Figure 4:
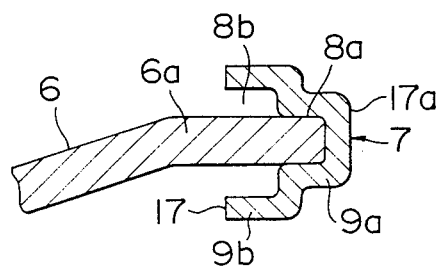
FIG. 4 is a sectional view taken along the line IV—IV in FIG. 1.

The rim core 7 has a cross-section shown in FIGS. 3 and 4. The cross-section is taken in a plane which contains the axis of the rim core 7. The rim core 7 has, as viewed in this cross-section, radially inner and outer sides 17 and 17a and stepped wall portions 9a and 9b which are spaced from each other and interconnect the two sides 17 and 17a, respectively. Because of the stepped profiles of the wall portions 9a and 9b, a first recess 8b is formed in the radially inner side 17 of the cross-section of the rim core 7 and has a bottom in which a second recess 8a is formed and directed radially inwardly of the rim core 7.

As will be seen from FIG. 3, each of the end portions 5a of the rod-type spoke core 5 fits in the first recess 8b so as to be sandwiched between the wall portions 9b and fixed in this recess 8b by, for example, resistance welding at its portions contacting the wall portions 9b. On the other hand, as shown in FIG. 4, the end portion 6a of the web-type spoke core 6 fits in the second recess 8a in the rim core 7 so as to be clamped between the wall portions 9a and fixed in the second recess 8a at its portions contacting the wall portions 9a by, for example, resistance welding.

Referring again to FIGS. 1 and 2, the rim core 7 is formed from an elongated straight blank which is provided with the first and the second recesses and bent to a circular form in such a manner that the first and the second recesses are open radially inwardly of the circle and that the both ends of the thus bent blank oppose each other at a position which is within the circumferential extension of the outer end portion 6a of the web-type spoke core 6.

It is thus possible to connect and fix the end portions 5a and 6a of the different types of spoke cores 5 and 6 of different thicknesses to the common rim core 7. A high strength of connection between the end portions 5a of the rod-type spoke core 5 and the rim core 7 is attained by virtue of the provision of the first recess, 8b which fittingly receives these end portions 5a. Similarly, a high rigidity of connection is attained between the outer end portion 6a of the web-type spoke core 6 and the rim core 7 because the end portion 6a fits in the second recess 8a formed in the radially inner side of the rim core 7. In addition, the stepped walls of the rim core 7 including the wall portions 9a and 9b provided a high rigidity of the rim core 7 itself.

As stated above, the rim core 7 is made from a single continuous elongated blank of a metal which is beforehand shaped to have a cross-section shown in FIGS. 3 and 4. The blank is bent in a circular form such that the first and the second recess 8b and 8a open radially inwardly so as to form the annular rim core 7.

The material of the blank of the core 7 may be either a steel or a light metal alloy such as an aluminum alloy or a magnesium alloy. The blank may be produced by extrusion or forming. The extrusion may be carried out by either cold working or hot working. The forming can be conducted by cold working in which a sheet metal is passed through a forming machine having a plurality (six or seven) of forming rollers.

Extrusion and forming are well-known to those in the art and thus are not described in more detail therein.

In the steering wheel core assembly shown in FIGS. 1 and 2, two types of spoke cores, namely, the rod-type spoke core 5 and the web-type spoke core 6, are assembled with the rim core 7. It will be understood, however, that the rim core 7 of the described embodiment can equally be used not only when the steering wheel core assembly has the rod-type spoke cores along but also when the assembly has the web-type spoke cores alone. Thus, the described embodiment of the steering wheel rim core 7 of the invention can be used for a plurality of types of steering wheel core assemblies having different combinations of spoke cores. This remarkably reduces the production costs of steering wheels especially when a plurality of types of steering wheels are to be produced.

Figure 5:
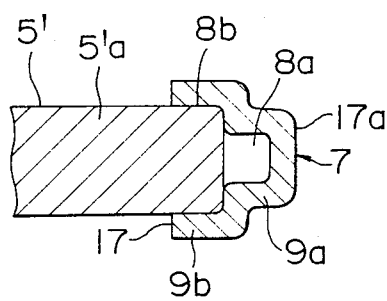
FIG. 5 is a fragmentary sectional view of the embodiment of steering wheel rim core which is shown in FIG. 3 but is combined with an end portion of a different spoke core.

FIG. 5 shows another example of the steering wheel core assembly in which each end portion 5'a of a rod-type spoke core 5' first in the first recess 8b in the rim core 7, without being bent along the curvature of the rim core 7. As in the case of the steering sheet core assembly shown in FIGS. 1 and 2, each end portion 5'a of the spoke core 5' is fixed between the wall portions 9b by, for example, resistance welding.

Figure 6:
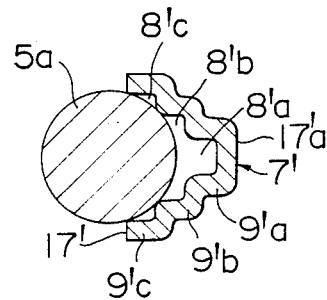
FIG. 6 is a sectional view of another embodiment of the steering wheel rim core of the present invention combined with a rod-type spoke core.
Figure 7:
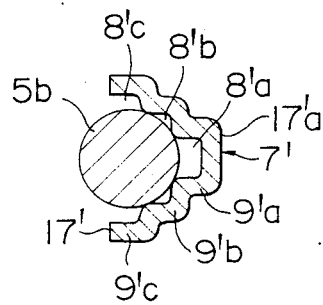
FIG. 7 is a sectional view of the embodiment shown in FIG. 6 combined with a rod-type spoke core of a diameter different that shown in FIG. 6.

FIGS. 6 and 7 show another embodiment of the rim core in accordance with the present invention. The rim core is denoted by numeral 7' and has stepped opposing walls having wall portions 9'c, 9'b and 9'a and defining therebetween first, second and third recesses 8'c, 8'b and 8'a having widths which decrease in the radially outward direction of the rim core 7'. In other words, the first recess 8'c is formed in the radially inner side 17' of the cross-section of the rim core 7' and has a bottom in which the second recess 8'b is formed, the second recess 8'b having its bottom formed therein with the third recess 8'a. This rim core 7' can be used with rod-type spoke cores of different diameters, as will be seen in FIGS. 6 and 7. It will be apparent that this rim core 7' can be produced by preparing an elongated blank of a cross-section having the first, second and the third recesses and by bending the blank into a circle such that these recesses open radially inward.

Figure 8:
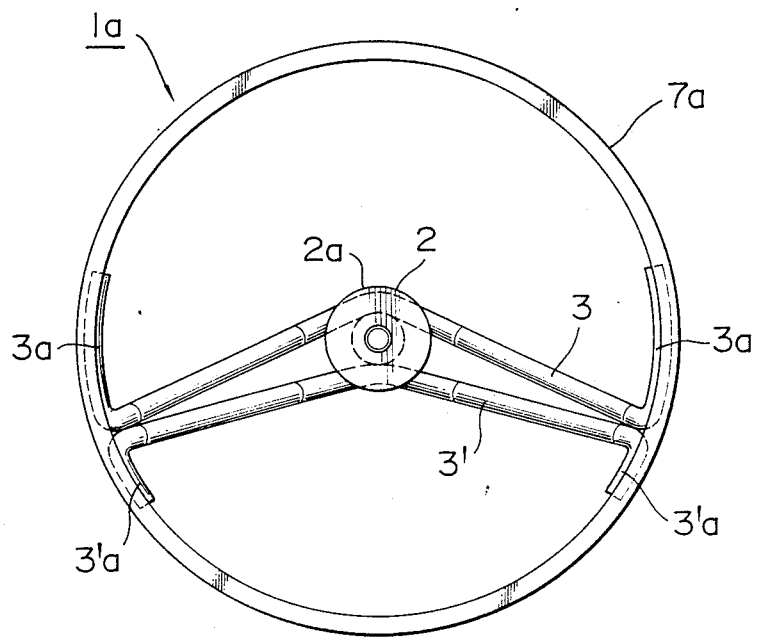
FIG. 8 is a plan view of another steering wheel core assembly including a still another embodiment the steering wheel of the present invention.
Figure 9:
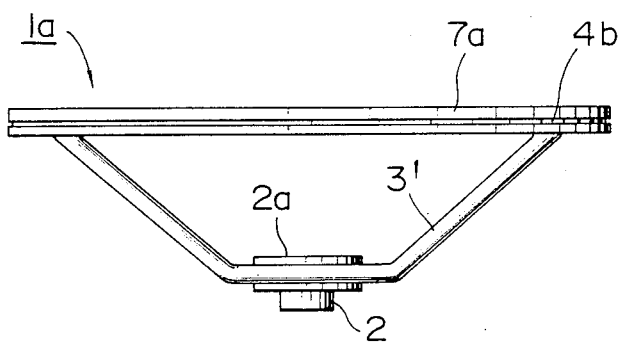
FIG. 9 is a side elevational view of the steering wheel core assembly shown in FIG. 8.

FIGS. 8 and 9 show a still another example of steering wheel core assembly generally denoted by 1a. The core assembly 1a has a central hub 2, an annular rim core 7a and a pair of spoke cores 3 and 3' each having a pair of spoke portions through which the rim core 7a is connected to the central hub 2. More specifically, the spoke cores 3 and 3' are fixed at the substantially mid portions to diametrically opposite portions of a flange 2a of the central hub 2 by, for example, resistance welding. The end portions 3a of the spoke core 3 are bent along the curvature of the rim core 7a and are fixed thereto in a manner which will be explained later. Similarly, the other spoke core 3' have both end portions 3'a bent along the curvature of the rim core 7a and fixed thereto.

Figure 10:
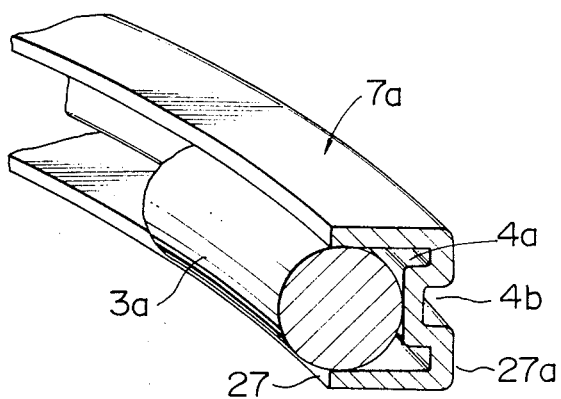
FIG. 10 is a fragmentary perspective view of the steering wheel rim core shown in FIGS. 8 and 9, with an end portion of a rod-type spoke core fitting in a first recess formed in the rim core.

As will be seen in FIG. 10, the rim core 7a has, as viewed in a cross-section taken in a radial plane containing the axis of the rim core, a first recess 4a which is formed in a radially inner side 27 of the rim core 7 and a second recess 4b which is formed in a radially outer side 27a of the rim core. Thus, the first and second recesses 4a and 4b are directed radially inwardly and outwardly, respectively. The end portions 3a and 3'a of the spoke cores 3 and 3' fit in the first recess 4a and are rigidly fixed to the rim core 7a by, for example, resistance welding. This rim core 7a is formed by preparing a straight elongated blank having the first and second recesses 4a and 4b as shown in FIG. 10 and by bending the blank into a circle such that the first recess 4a opens radially inwardly of the circle.

Figure 11:
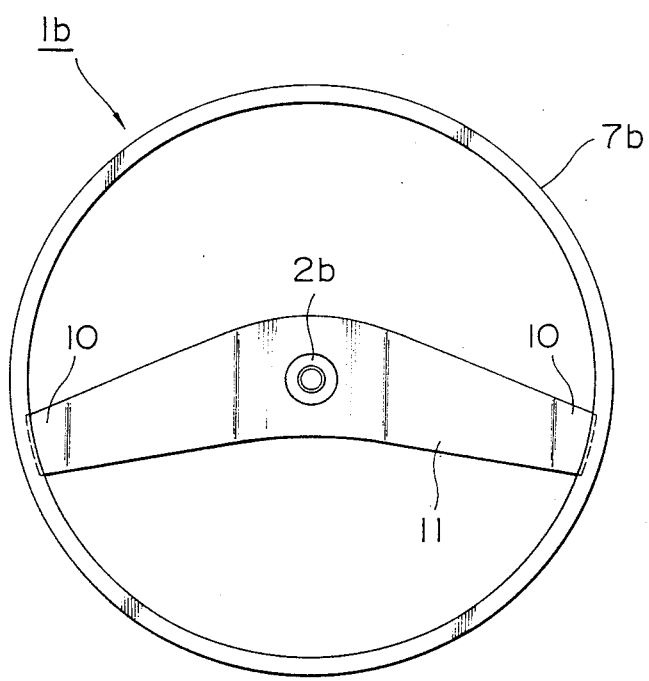
FIG. 11 is a plan view of a still another steering wheel core assembly employing a further embodiment of the steering wheel rim core in accordance with the present invention.
Figure 12:
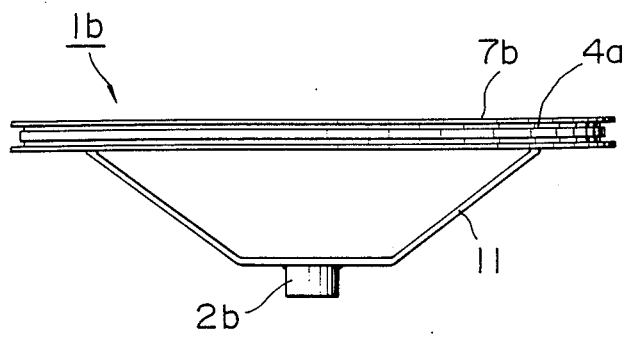
FIG. 12 is a side elevational view of the steering wheel core assembly shown in FIG. 11.
Figure 13:
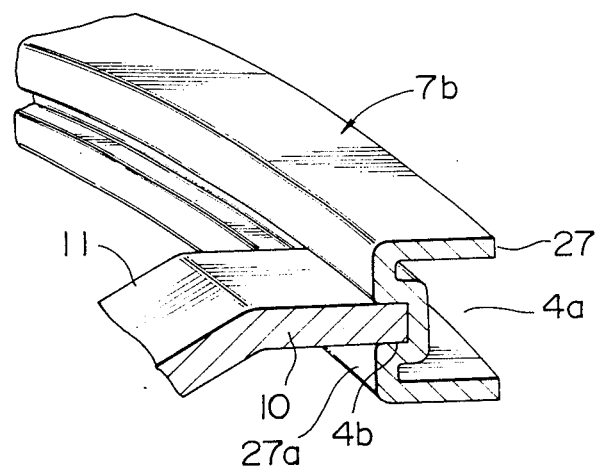
FIG. 13 is a fragmentary perspective view of the steering wheel rim core shown in FIGS. 11 and 12, with an end portion of a web-type spoke core fitting in a second recess formed in the rim core.

Referring to FIGS. 11 and 12, there is shown a further example of the steering wheel core assembly generally denoted by 1b. The assembly 1b has a central boss 2b, a rim core 7b and a web-type spoke core 11 through which the rim core 7b is connected to the central hub 2b. More specifically, the spoke core 11 is secured at its mid portion to the central hub 2 by welding, while each end portion of the web-type spoke 11 fits in a second recess 4b of the rim core 7b, as shown in FIG. 13, and is fixed to the rim core 7b by, for example, resistance welding, whereby the spoke core 11 is rigidly connected to the rim core 7b. It will be understood that the rim core 7b has a cross-section which is inverted radially of the rim core from the cross-section of the rim core 7a of the preceding embodiment described in connection with FIG. 10. The rim core 7b, therefore, can be produced by bending the rim core blank of the rim core 7b of the preceding embodiment such that the second recess 4b opens radially inwardly of the rim core 7b.

The rim cores 7a and 7b embodying the present invention exhibit an increased rigidity by virtue of the presence of the recesses 4a and 4b in the radially inner and outer sides thereof. In addition, a high strength of connection is attained between these rim cores and associated spoke cores because the spoke cores fit in respective recesses.

It will be appreciated that a single kind of blanks of rim cores can be used selectively with two types of spoke cores, i.e., the rod-type spoke cores shown in FIG. 8 and the web-type spoke cores shown in FIG. 13, by bending each blank into a circular shape to form a rim core such that one of the first and second recesses, which fits the spoke core to be used, opens radially inwardly of the rim core. In consequence, the production cost of steering wheels can be reduced because the rim cores of the same design can be used in the production of different types of steering wheels having different shapes and thicknesses of the spoke cores.

What is claimed is:

1. An annular rim core for a steering wheel having at least one spoke through which said annular rim core is connected to a central hub, said annular rim core comprising:
    an annular rim structure having a pair of axially spaced side walls and a radially outer wall having a radially outwardly directed outer surface and interconnecting said side walls, such that said rim structure is open in the radially inward direction, wherein said side walls and said radially outer wall are shaped such that a first annular recess having first thickness dimension is formed between said side walls for receiving therein a spoke core of said first thickness dimension and a second annular recess is formed in one of a bottom of said first annular recess and said radially outwardly directed outer surface, said second annular recesses having an axially measured second thickness dimension smaller than said first thickness dimension.

2. The rim core of claim 1, wherein at least one of said side walls comprises a first side wall portion connected to said radially outer wall, a second side wall portion axially offset from said first side wall portion and a radially inwardly facing annular step interconnecting said first and second side wall portions, such that said first annular recess is formed between said side walls radially inwardly of said annular step and said second annular recess is formed between said side walls radially outwardly of said annular step and is in communication with said first annular recess, and wherein said second thickness dimension of said second annular recesses is sized to receive a spoke core of said second thickness dimension.

3. The rim core of claim 2, wherein each of said pair of side walls comprises said first and second side wall portions and said annular step.

* * * * *